Figure 1:
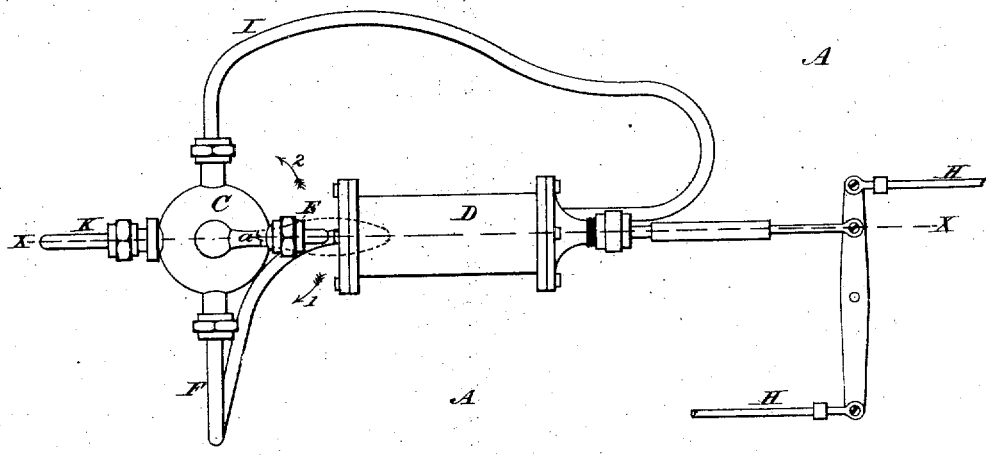
Figure 2:
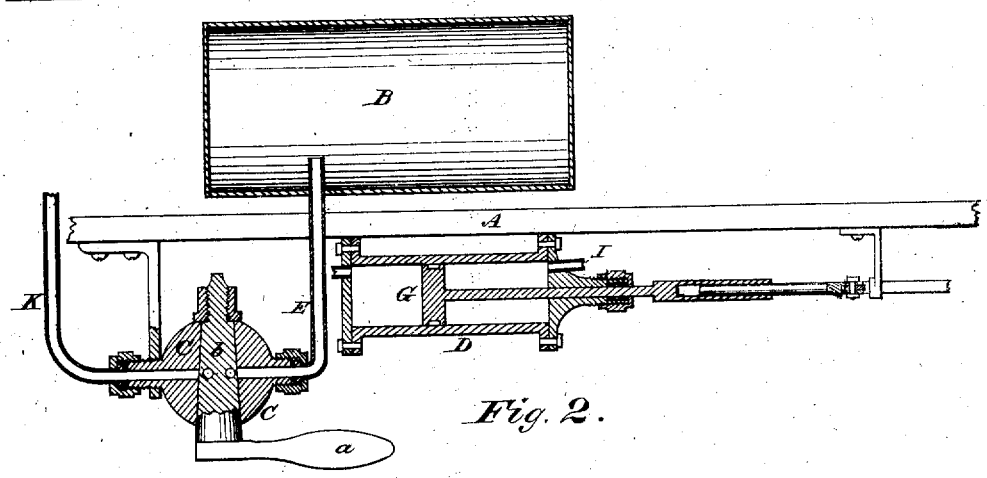
Figure 3:
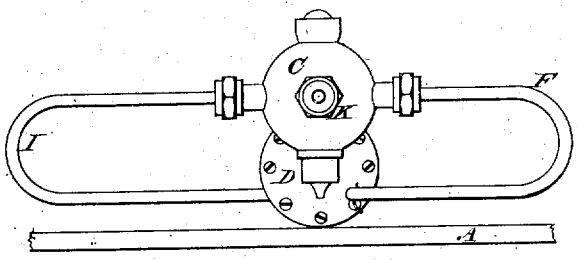
Figure 4:
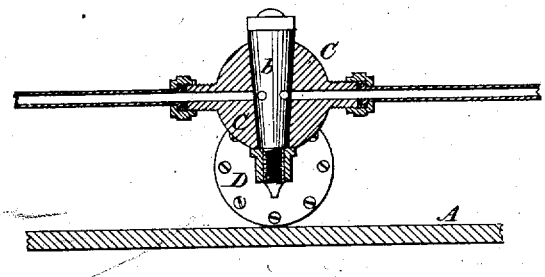
Figure 5:
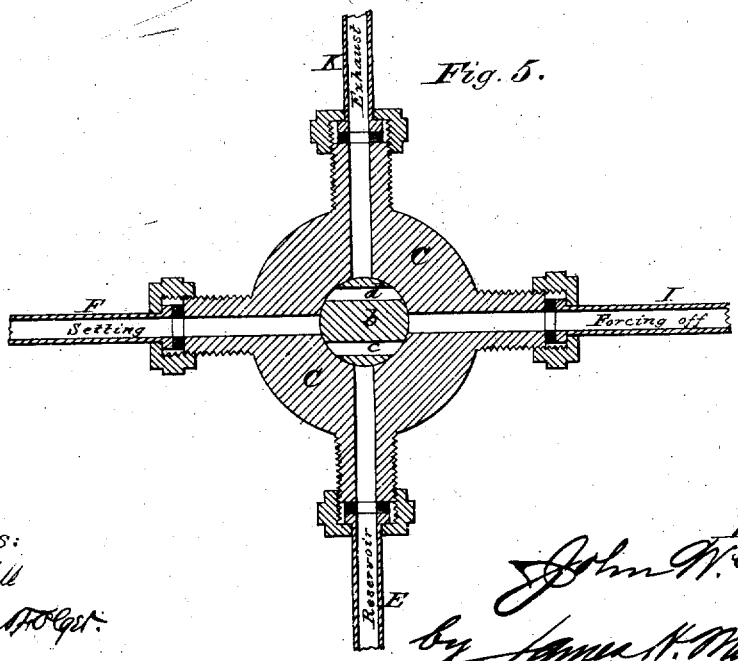

JOHN W. GARDNER.

Improvement in Steam and Air Brakes.

No. 4,879. Reissued April 23, 1872.

Witnesses:
J. L. Campbell
Thos. C. Thorpe

Inventor:
John W. Gardner,
by James N. Mandeville
his Attorney.

2 Sheets--Sheet 2.

JOHN W. GARDNER.

Improvement in Steam and Air Brakes.

No. 4,879. Reissued April 23, 1872.

Witnesses:
[illegible]
Thos. A. Foster

Inventor:
John W. Gardner,
by James H. Mandeville
his Attorney

UNITED STATES PATENT OFFICE.

JOHN W. GARDNER, OF CLEVELAND, OHIO.

IMPROVEMENT IN STEAM AND AIR BRAKES.

Specification forming part of Letters Patent No. 122,884, dated January 23, 1872; reissue No. 4,879, dated April 23, 1872.

SPECIFICATION.

*To whom it may concern:*

Be it known that I, JOHN W. GARDNER, of Cleveland, county of Cuyahoga and State of Ohio, have invented a new and useful Improvement in Air and Steam Brakes for Railroad-Cars, of which the following is a full, clear, and exact description:

My invention, first, is a combined air and steam brake, using either compressed air or steam, both to "set" and to "force off" railroad-car brakes; second, a four-way cock, in combination with an air or steam brake, for changing the air or steam current, so that when either of these elements enters into one end of a common steam-cylinder and piston beneath each car the brakes will be set to the wheels, but when they enter into the other end of such cylinder the brakes will be instantly forced off from the wheels.

My invention is an improvement upon the steam and compressed-air brakes a long time since invented in England, and which, within the past few years, have been introduced into public use in the United States.

In the steam-brake referred to as of foreign invention, the engineer turns a stop-cock, whereby steam from the boiler of the locomotive is conveyed through pipes the whole length of the train, connection being made between the cars by means of flexible pipe or tubing. The steam passes through branches from the main pipe into common steam-cylinders placed under every car, which have air-tight pistons. The outer ends of the piston-rods are securely fastened to brake-levers, so that when steam enters into the cylinders and forces forward the piston-rods, the brake-levers instantly apply brake-shoes to the car-wheels. When the engineer desires to start his train he reverses the position of the stop-cock, thereby permitting the steam in the cylinders to return to the locomotive, where it escapes into the natural atmosphere. As the steam-pressure decreases in the cylinders, owing both to its condensation and escape, and by the aid of springs at each brake, the brake-shoes are gradually released from the wheels. It is also an old device to keep up a current of steam all around the train, so that cold weather will not interfere with the working of the brakes; and in an expired American patent there is described a valve to be inserted into the flexible pipe between the cars, so that if they become detached through such disaster as, for instance, the precipitation of one car upon another, or of a portion of the train through a broken trestle or down an embankment, the act of disruption thereupon occurring will close the valve, and thus prevent the releasing of the brakes if they were set previous to the wrecking of the cars.

In the compressed-air brake referred to as of foreign invention, an air-pump, usually operated by an eccentric on the axle of the drive-wheel of the locomotive, pumps air into a reservoir, where it is held under compression, the quantity of air in the reservoir being indicated by a pressure-gage in the cab of the locomotive. The engineer, by means of the devices above described, in connection with the steam-brake, and precisely in the same manner as the steam-brake is operated, stops the train by applying compressed air to the brakes through the medium of the cylinders and pistons; and in order to release the brakes from the wheels he reverses the position of the stop-cock, which permits the air to return to the locomotive, where it escapes into the natural atmosphere.

It will thus be seen that the means for producing the above-detailed result (the setting of the brakes) differ only in the employment in one case of steam, and in the other case of compressed air; and, with the exception of the air pump and reservoir, when compressed air is employed, the two devices are alike in this respect, that they both use the same general machinery, and are, to all appearance, of the same general construction. Great care has been taken in these reissued Letters Patent to detail at considerable length the state of the art in air and steam car-brakes before they were introduced into common use in the United States.

Referring to the drawing annexed to and forming a part of this specification, Figure I represents a plan view; Fig. II, a sectional elevation through the line *x x*, Fig. I; Fig. III, an elevation of the four-way cock and cylinder; Fig. IV, a sectional elevation of valves; and Fig. V, a longitudinal section of valves, showing four different outlets and the valve-stem.

A represents the foot-board of the locomotive; B, the reservoir for holding compressed air; C, the four-way cock; and D, a common cylinder and piston, into which is let either steam or compressed air, both to set and to force off the car-brakes. The cylinder is placed under the tender and cars of the entire train. The setting of the brakes in this invention is done in the same way as in the inventions in air and steam brakes which have a long time since become the property of the public, and for that purpose the apparatus embraces the same general machinery—the air-pump, air-reservoir, connection-pipes, and cylinders and pistons which operate the brakes. The compressed air passes from the reservoir B through a pipe, E, and the four-way cock C, and thence through another pipe, F, into the cylinder D, where the air works a piston-head outward, and thus applies power to the brake-levers H H, which set the brake-shoes to the car-wheels; but when steam is used, the general machinery being the same, of course, as will be obvious to any machinist, there is a connection-pipe between the four-way cock and the boiler, (not shown;) and, as steam may be preferable in some instances, this apparatus is so constructed that steam may be used at pleasure by simply disconnecting the pipe E from the reservoir and connecting it to the boiler.

The features of this invention, or the improvement upon the compressed-air and steam brakes in common use for many years, will now be fully set forth. Supposing that the brakes have been set and are in that position when the engineer desires to start his train, he turns the four-way cock a one-quarter turn in a reverse direction to the way in which he turned it when he set the brakes. The air or steam which then flowed through the pipe F and into the front end of the cylinder now passes through the four-way cock and flows through the pipe I, which enters the rear end of the cylinder D (under each car) opposite the pipe F. The same amount of power which almost instantly set the brakes now instantly forces them off, and consequently expels the air or steam in the pipe F and cylinder D, through the four-way cock and exhaust-pipe K, into the natural atmosphere.

It here becomes necessary to describe the four-way cock C; reference, therefore, is made in this connection to Figs. IV and V. In dimensions it is large enough to cover the diameters of the largest pipe used to conduct the air or steam from the reservoir or boiler to the cylinder under the cars, which, obviously, will depend on the length of the train and the uses to which the cars are applied; for passenger-trains a three-quarter-inch ordinary gas-pipe will probably be sufficient, but for heavy trains it might be desirable to use an inch-and-a-quarter pipe. It will be seen in Fig. V that four pipes are connected to the four-way cock—the pipe E, leading from the reservoir or boiler, the two pipes F and I, connecting the four-way cock with the cylinders, and the exhaust-pipe K. By turning the handle *a* of the plug or valve *b* from the position shown in Fig. I, (in direction of the arrow 1,) the opening *c* of the plug will make a connection between the pipes E and F, and the opening *d* on the valve-stem will make another connection between the pipes I and K. The brakes are now set. But by turning the handle *a* in the reverse direction, as shown by the arrow 2, the opening *c* in the stem will make a connection between the pipes E and I, while the opening *d* will make another connection between the pipes F and K. This will instantly force off the brakes.

In the common form of steam and compressed-air brakes, such as have been herein described, the brakes cannot be let off instantly. In a train of ten cars, for example, where the brakes are set, there is an estimated pressure upon them of from twenty to forty pounds per square inch. It is certain that the pressure is sufficiently great, if applied suddenly, to slide the wheels. To relieve the brakes of this pressure there is required, by the old construction of air and steam brakes, not less than two minutes—often three and four minutes—for the steam or air to discharge itself into the natural atmosphere through the exhaust-pipe K, for it has to return through a common gas-pipe over four hundred feet, propelled only by its elasticity and the assistance of springs upon the brakes or pistons. If a train be running on short time for "meeting-points," the saving of one or two minutes at a station (or an accidental stoppage) might enable the engineer to make his destination and pass an approaching train; but the loss of three minutes during the whole run to the meeting-point might compel him to delay his train an hour, the approaching train having the right of way, if on a single track, where the next side track is ahead a long distance. It is, therefore, clearly apparent that a large amount of time can be saved by the use of this invention. In cases of obstruction on the track, by this apparatus a train of cars can be stopped almost instantly, for it is entirely under control of the engineer. But in danger of collision, where it is not only necessary to stop the train, but instantly to back it out of danger, so as to save the great destruction both of life and property, the great and paramount utility of this invention must be apparent to all fair and reflecting minds. It is economical in construction, and, owing to its simplicity, none of its parts being subject to undue strain or wear, it may be called void of all complication. It should here be observed that the ordinary hand-brakes are also erected upon the cars as additional security. In addition to what has already been said, it may be well observed that, if it be necessary to start a train from a "stand-still" while the brakes are partly on the wheels, or before the air or steam has escaped sufficiently to release the brakes from the wheels, a greater strain will be required from the locomotive, as it must overcome the additional resistance of the brakes. This would require a greater consumption of steam, and consequently a greater amount of fuel to generate it, for the additional service demanded from the locomotive; and it should not be overlooked that, by the use of this invention, there must result a great decrease in the wear and tear of machinery, as a cast-iron brake-shoe, rubbing upon a cast-iron car-wheel, would tend greatly to injure its tread and flange.

I distinctly disclaim the setting of car-brakes by the use either of steam or compressed air, for all the devices herein described for that purpose are old and the property of the public, being fully set forth in many expired English patents and other foreign publications; but

What I claim as new, and desire to secure by Letters Patent, is—

1. The method of applying either compressed air or steam to force off car-brakes, substantially as above set forth.

2. The combination of the four-way cock C, the pipes E, F. I, and K, and the cylinder D, so as to enable car-brakes instantly to be set to and to be forced off from car-wheels by the use of either compressed air or steam.

3. The four-way cock C, as herein described, for changing the air or steam current to either end of the cylinder D, for the purpose of setting and forcing off car-brakes.

In witness whereof I hereto subscribe my name to the foregoing specification at Cleveland, Ohio, this 2d day of April, 1872, in the presence of three attesting witnesses.

JOHN W. GARDNER.

Three witnesses:
JNO. THOMAS,
W. H. RILEY,
JEFFERSON FISHER.